United States Patent [19]

Devlin

[11] Patent Number: 5,465,862
[45] Date of Patent: Nov. 14, 1995

[54] AIRCRAFT SERVICING PIT LID WITH LIFT CONTROL

[75] Inventor: Mike Devlin, Anaheim, Calif.

[73] Assignee: Dabico, Inc., Costa Mesa, Calif.

[21] Appl. No.: 294,802

[22] Filed: Aug. 25, 1994

[51] Int. Cl.⁶ .............................. B65D 43/24; E05F 1/08
[52] U.S. Cl. ........................ 220/335; 16/278; 16/298; 16/305; 16/306; 16/307; 49/379; 49/386; 220/484
[58] Field of Search ........................... 16/305, 306, 307, 16/300, 298, 278; 220/484, 335; 244/114 B, 114 R; 114/261, 262; 49/386, 379

[56] References Cited

U.S. PATENT DOCUMENTS

| | | | |
|---|---|---|---|
| 3,351,975 | 11/1967 | Goto. | |
| 3,615,134 | 10/1971 | Newcomb | 49/386 X |
| 4,185,415 | 1/1980 | LaConte | 49/386 X |
| 4,467,932 | 8/1984 | Dabich. | |
| 4,473,261 | 9/1984 | Jungmann. | |
| 4,535,908 | 8/1985 | Dabich. | |
| 4,706,334 | 11/1987 | Beckwith | 16/298 X |
| 4,709,445 | 12/1987 | Waldo et al. | 16/300 |
| 5,205,073 | 4/1993 | Lyons, Sr. | 49/386 |
| 5,373,665 | 12/1994 | Lyons, Sr. | 49/386 |

Primary Examiner—Allan N. Shoap
Assistant Examiner—Robin A. Hylton
Attorney, Agent, or Firm—Charles H. Thomas

[57] ABSTRACT

A closure apparatus for a subsurface pit for servicing an aircraft located beneath an aircraft servicing surface across which aircraft travel is provided with an improved spring biasing arrangement. The system employs separate springs interposed between the hollow body of the pit and the lid so as to urge the pit lid from its horizontal seated position toward a fully raised position. Obstructions are provided for separately intercepting and disengaging the springs from acting against the pit lid as the pit lid is opened through intermediate angular positions between the horizontal seated position and the fully raised position. By sequentially isolating the pit lid from the action of each of the springs, one at a time, the moment of spring force opposing closure of the lid more closely follows the moment of the force of gravity tending to close the lid. This substantially reduces the maximum manual force that is thereby required to overcome gravity in opening the pit lid. The preload of each spring is preferably individually adjustable so as to allow the spring force to be fine tuned to closely match the force of gravity throughout the arcuate path of travel of the pit lid.

18 Claims, 5 Drawing Sheets

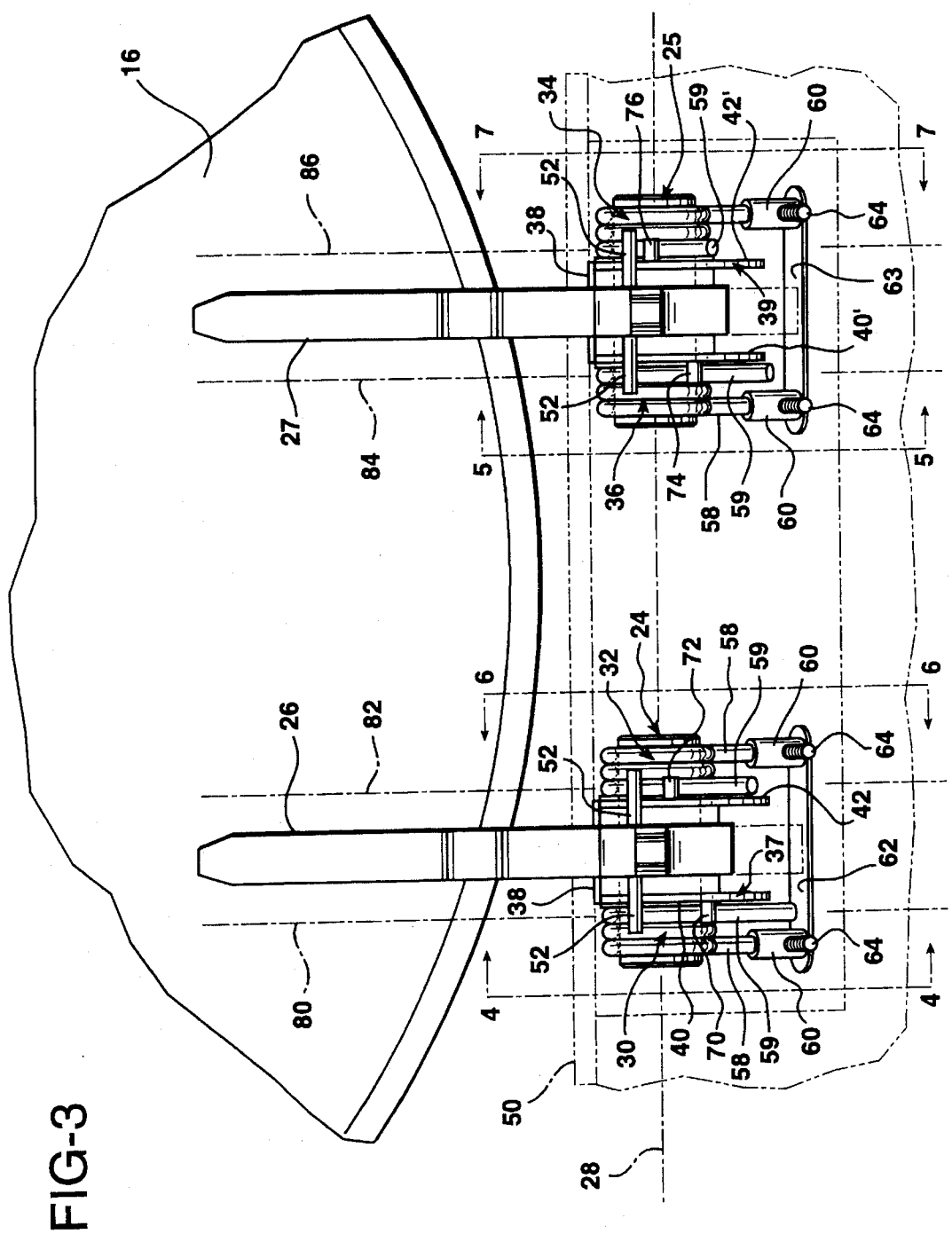

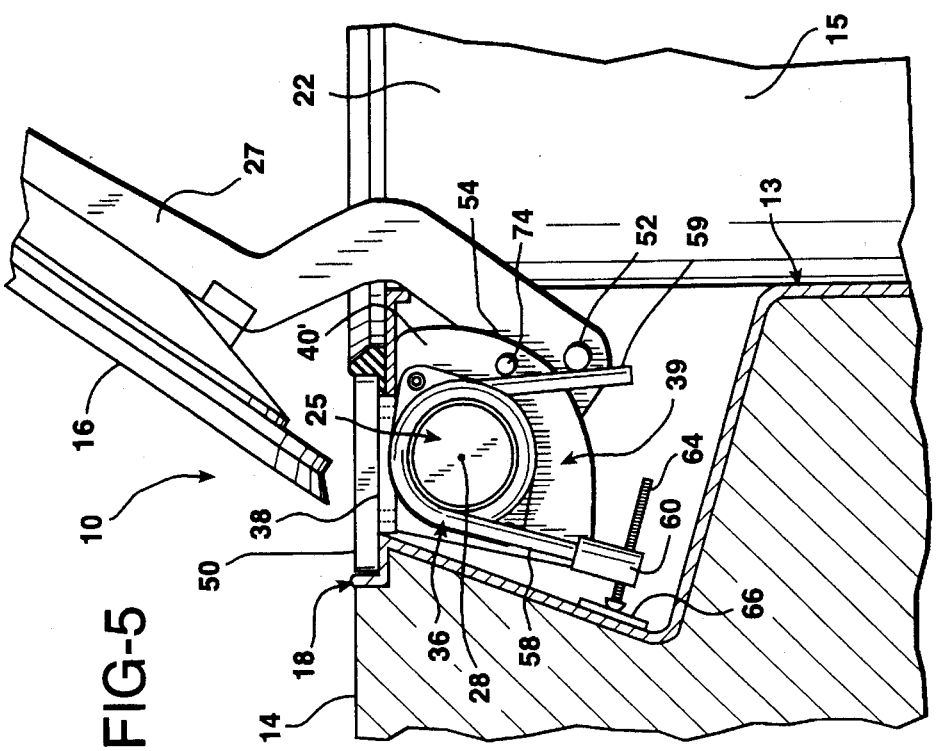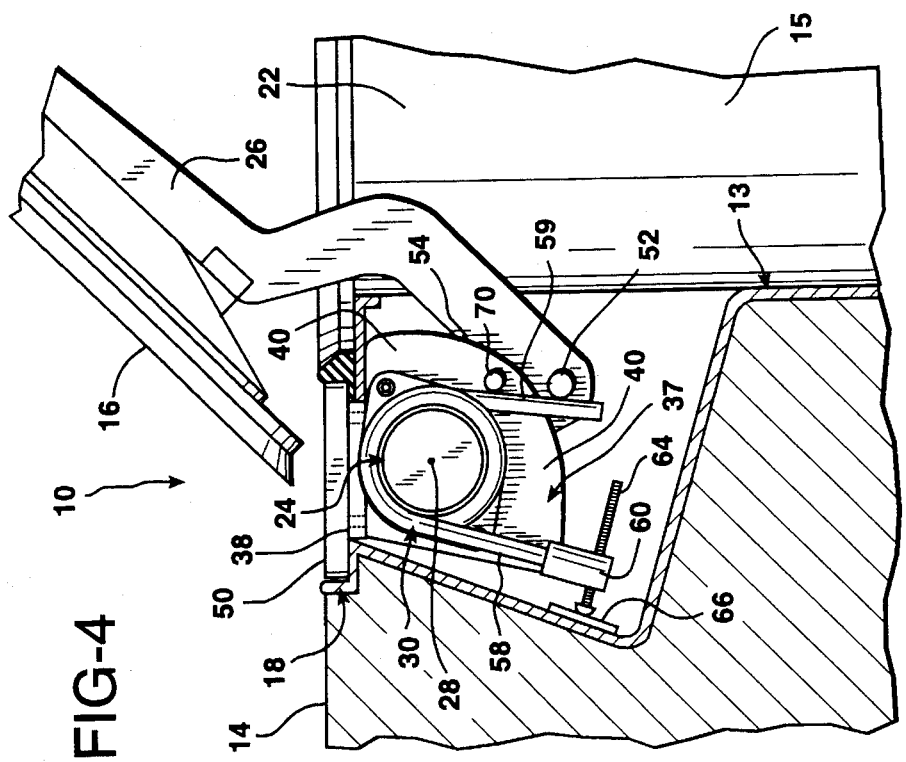

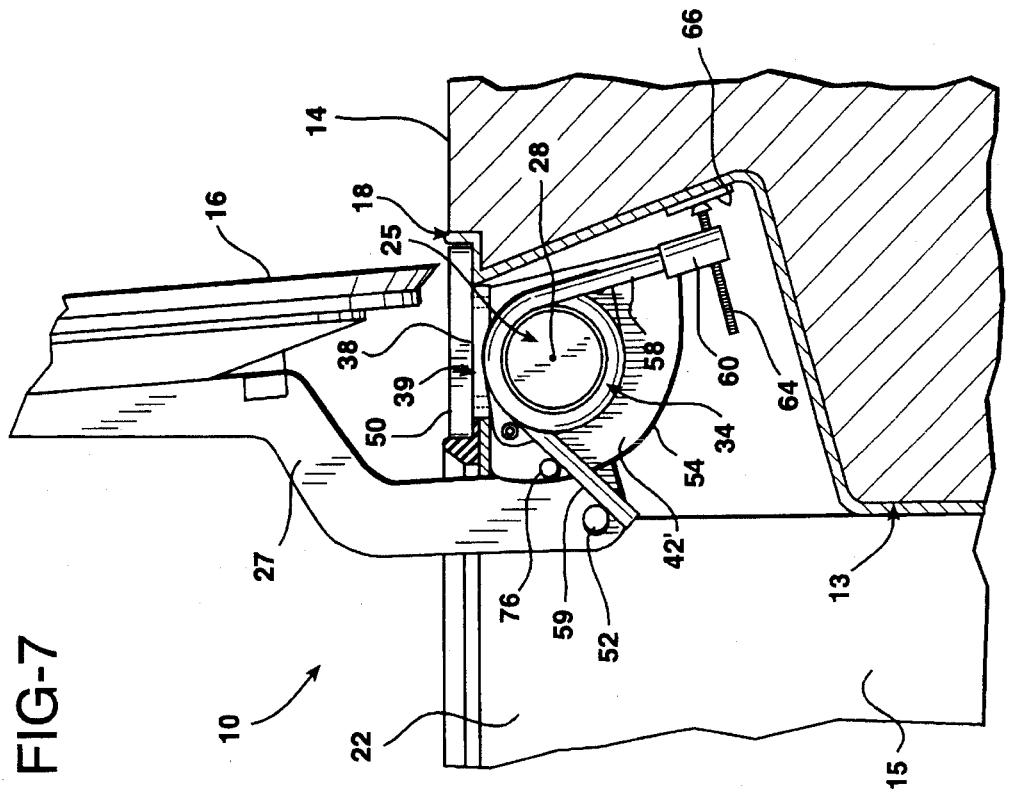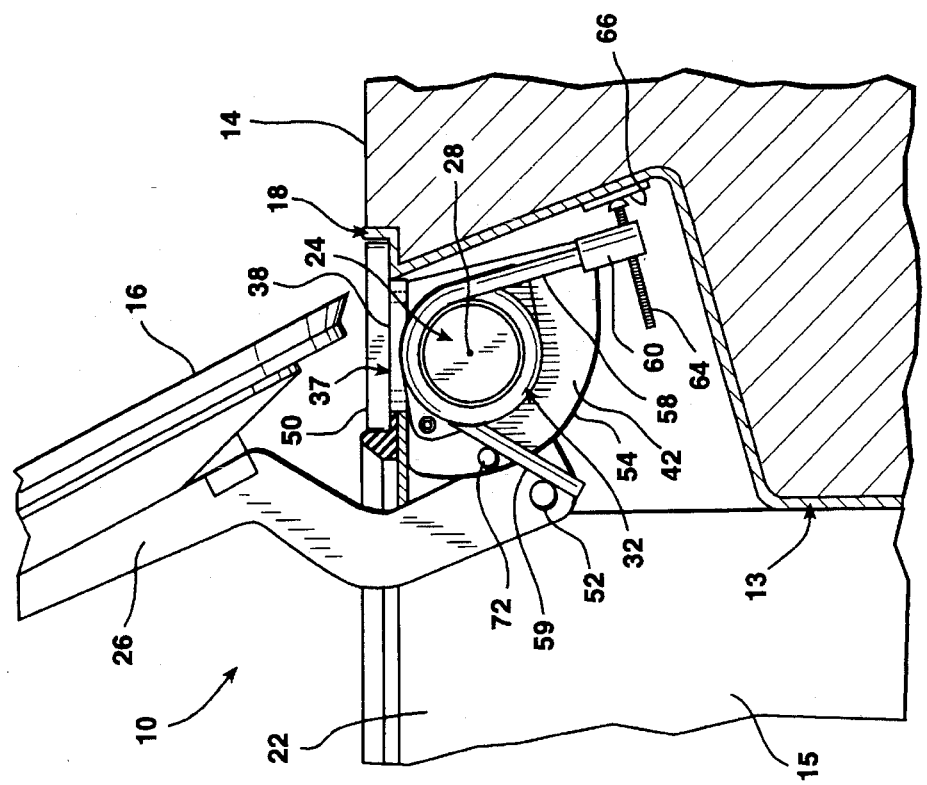

AIRCRAFT SERVICING PIT LID WITH LIFT CONTROL

BACKGROUND OF THE INVENTION

1. Field of the Invention

The present invention relates to a lid assembly for alternatively closing and providing access to a subsurface pit for servicing aircraft located beneath an aircraft servicing surface across which aircraft travel while on the ground.

2. Description of the Prior Art

At modern aircraft terminals servicing of aircraft on the ground is frequently performed using prefabricated pits which are installed at aircraft docking, fueling and loading areas beneath the surface of the tarmac across which aircraft travel during docking and departure maneuvers. The pits are typically formed of fiberglass, steel or aluminum and are constructed as enclosures with surrounding walls, and an access lid at the top of the walls. The pits are installed below the surfaces of loading and refueling aprons at aircraft terminals, remote parking locations and maintenance bases.

The purpose of the pits is to allow ground support functions to be carried out from subsurface enclosures. These ground support functions include the provision of fuel, the provision of electricity to the aircraft while it is in the docking area, the provision of air for cooling the aircraft interior, the provision of pressurized air for starting the aircraft engines, and for other aircraft support activities on the ground. The use of subsurface pits eliminates the need for mobile trucks, carts and other vehicles which are otherwise present in the loading area and which interfere with the arrival and departure of aircraft in the vicinity of a loading gate. The use of subsurface pits also allows the provision of fuel, power, cooling and pressurized air, and other supplies from a central location. The necessary fluid supplies and electrical power can be generated or stored with great efficiency at a central location, as contrasted with mobile generating or supply vehicles.

The pits located below the aircraft terminal area house valves, junction boxes, cooling air terminations and other terminal equipment that is temporarily connected to an aircraft that has been docked. Umbilical pipes and lines, otherwise housed within the pits, are withdrawn from the pits through hatches therein and are coupled to a docked aircraft to supply it with fuel, air for cooling the aircraft interior, pressurized air for starting the engines, and electrical power.

The pits are constructed with heavy lids atop hollow pit bodies. The hatches through which hoses, lines, and cords are withdrawn are seated within the lids, so that during the day-to-day operations it is normally unnecessary to open the lids. However, there are times when greater access to the pits is required. For this reason the lids are either hinged or they may be lifted and removed entirely from a lid mounting frame. This allows ground personnel to perform servicing tasks that cannot be done through the smaller hatch openings.

The lids are movable between open positions allowing access to the pits and closed positions in which the upper surfaces of the lids are flush with the surface of the docking, loading or refueling area across which aircraft travel and beneath which the pits are mounted. Because the pits are located beneath the surface upon which the aircraft travel while on the ground, aircraft servicing personnel must sometimes descend into the pit in order operate valves, free aircraft refueling lines, electrical power lines, air conditioning ducts, and to otherwise perform operations that cannot be accomplished through the relatively small hatch openings in the lids.

Some access lid assemblies are not hinged to the mounting frame. The access opening to the subsurface pit is exposed by lifting the lid vertically upwardly by means of hand grips cast into the structure of the lid. Since the lid of the pit must be heavy enough to withstand the weight of the wheels of a heavy aircraft, pit lids typically weight any where from between about 50 pounds up to 1,000 pounds or even more. Therefore, it is highly desirable for the pit lids to be hinged and for some type of lift assistance to be employed so that the pit lids can be manually raised from a seated position. Typically, conventional pit lids of this type are provided with either a counterweight system, such as that described in U.S. Pat. No. 4,467,932, or heavy duty springs to assist in raising the lid. In either case the lid is urged upwardly from a closed position seated in the mounting frame to a raised position by some mechanical assist mechanism.

One problem that exists with a gravity operated counterweight system is that the counterweights must be mounted on relatively long arms and must swing freely down into the pit as the lid is raised. This increases the space requirements within the pit to accommodate the movement of the counterweights. Also, the hoses and lines employed within the pit can become entangled with the counterweight arms or obstruct their movement.

One significant problem that exists with spring assisted pit lids is that the manual lifting force required varies considerably over the arc through which the pit lid moves from a closed to a fully opened position. This variation in lifting force required is considerable due to the heavy weight of the pit lid.

The basic problem of using springs to open a cover through a arc of 90 degrees or more is that the lifting force required to overcome the weight of the cover decreases in a nonlinear manner as the cover is raised. Specifically, the manual lifting force required, unaided by a spring or counterbalancing mechanism, decreases sinusoidally from a maximum when the lid resides in a horizontal, closed position to a minimum when the lid has been opened through an arc of 90 degrees. This is because an increasing portion of the weight of the lid bears against and is carried by the structure of the pit lid frame which transfers the force to the surrounding pavement as the lid approaches an alignment perpendicular to its horizontal, seated position. The force of an elastically deformed spring arranged to assist in opening the pit lid, on the other hand, expends its counteracting stored energy as a linear function of movement of the pit lid through the same 90 degree arc.

The spring force aiding the manual lifting force required is at a maximum when the pit lid resides in the horizontal, closed position. This maximum force must be somewhat less than the maximum lifting force required or the lid would pop open of its own accord. Current design standards require the force necessary to lift the lid from its closed position to be a force on the order of 25 pounds. Consequently, the springs must exert an opening force on the pit lid which is 25 pounds less than the weight of the pit lid when the lid is closed.

As the lid is opened, however, the moment of the spring force that aids the moment provided by the manual lifting force decreases linearly, which initially represents a much more rapid rate of decrease than the opposing moment resulting from the weight of the pit lid in rotating in through an arc. Thus, to continue lifting the lid an increasingly large lifting force must be manually applied until the lid has opened through an arc of 45 degrees. It is only at this point that the rate of decrease of the moment resulting from the gravitational force acting to close the lid exceeds the rate of decrease of the moment of the relaxing springs. As the lid approaches a vertical position, the manual lifting force required approaches zero. However, the manual lifting force that is required to move the lid through the portion of the 90 degree arc between about 10 degrees and about 60 degrees from horizontal is unacceptably large.

SUMMARY OF THE INVENTION

The present invention involves a spring assisted system for reducing to a very considerable degree the maximum manual force required to open a hinged aircraft servicing pit access lid. In concept the system of the invention is designed so as to mechanically approximate in the springs the sine curve of the cover lift weight. This object is achieved by setting a considerable preload in the springs, and then removing the force of the springs of the lid, one at a time, as the pit lid is opened. This design allows the pit lid lift force to be quite low, but still prevents the cover from acting as a catapult as the pit lid approaches a vertical orientation. All spring force is removed from the pit lid as it passes through the last five degrees of its 90 degree arc.

In one broad aspect the present invention may be considered to be an improvement in a closure apparatus for a subsurface pit for servicing aircraft located beneath an aircraft servicing surface across which aircraft travel. Such a pit has a hollow body and a lid mounting frame thereabove located flush with the aircraft servicing surface and defining a pit access opening into the hollow body. A lid strong enough to withstand the weight of the tires of an aircraft travelling thereacross is provided for the access opening. A hinge mechanism is secured relative to the hollow pit body and is connected to the lid at a peripheral location thereon for carrying the lid in rotation about a horizontal axis between a horizontal position seated on the mounting frame and a fully raised position in which the lid resides at an angle relative to the aircraft servicing surface. The improvement of the invention is comprised of a plurality of biasing means interposed between the hollow pit body and the pit lid so as to urge the pit lid from the horizontal seated position toward the fully raised position. The improvement also includes some means for disengaging at least one of the biasing means when the lid reaches an intermediate position in moving from the horizontal seated position toward the fully raised position.

The biasing means is preferably formed of a plurality of torsionally wound coil springs mounted beneath the aircraft servicing surface and having first and second ends. The first ends of the coil springs bear against the hollow pit body. The second ends of the coil springs bear against the lid when the lid is in the horizontal seated position. The disengaging means preferably includes separate obstruction members for separately intercepting and immobilizing each of the second ends of the springs as the pit lid reaches different angles of orientation relative to the horizontal seated position in moving from the horizontal seated position toward the fully raised position.

In another broad aspect the present invention may be considered to be a pit for servicing aircraft located beneath an aircraft servicing surface across which aircraft travel while on the ground. The pit is comprised of a hollow body defining a subsurface chamber and a lid mounting frame at the top of the hollow body defining an access opening to the subsurface chamber therewithin. The assembly also includes a lid strong enough to withstand the weight from the tires of an aircraft travelling thereacross for covering the access opening. A hinge mechanism is secured with respect to the lid mounting frame at a peripheral location relative to the pit lid and connected to the lid so that the lid is rotatable between a horizontal position seated in the lid mounting frame and a raised, fully opened position in which the lid resides at an angle relative to the aircraft servicing surface. The assembly also includes a plurality of springs interposed between the lid and the hollow body to urge the lid from the seated position toward the fully opened position. In addition the assembly includes a spring disengaging means for disengaging at least one of the springs from the lid at an intermediate position of rotation of the lid between the seated and fully opened positions.

In still another broad aspect the invention may be described as an improvement in an access lid assembly that includes a lid able to withstand the weight applied by the tires of an aircraft travelling thereacross and a mounting frame located atop a subsurface chamber used to service aircraft and defining an opening therewithin in which the lid is moveable to a horizontal, seated position. A hinge joins the lid to the mounting frame for upward rotation about a horizontal axis from the horizontal position through an arc of at least ninety degrees to a fully opened position. A plurality of springs are interposed between the lid and the mounting frame and act in parallel to urge the lid in rotation from the seated position toward the fully opened position. The improvement of the invention is comprised of disengaging means for isolating at least one of the springs from the lid once the lid reaches a predetermined arcuate angle of rotation from the seated position that is short of the fully opened position.

The invention may be described with greater clarity and particularity with reference to the accompanying drawings.

DESCRIPTION OF THE DRAWINGS

FIG. 3 is a front elevational view of the access pit lid assembly of FIG. 2 shown with the lid shown in its fully raised position.

FIG. 4 is a sectional elevational detail taken along the lines 4—4 of FIG. 3 shown with the pit lid rotated through an arc of 55 degrees from its closed position.

FIG. 5 is a sectional elevational detail taken along the lines 5—5 of FIG. 3 showing the pit lid rotated through an arc of 65 degrees from its closed position.

FIG. 6 is a sectional elevational detail taken along the lines 6—6 of FIG. 3 showing the pit lid opened through an arc of 75 degrees from its closed position.

FIG. 7 is a sectional elevational detail taken along the lines 7—7 of FIG. 3 showing the pit lid opened through an arc of 85 degrees from its closed position.

DESCRIPTION OF THE EMBODIMENT

Figure 1:
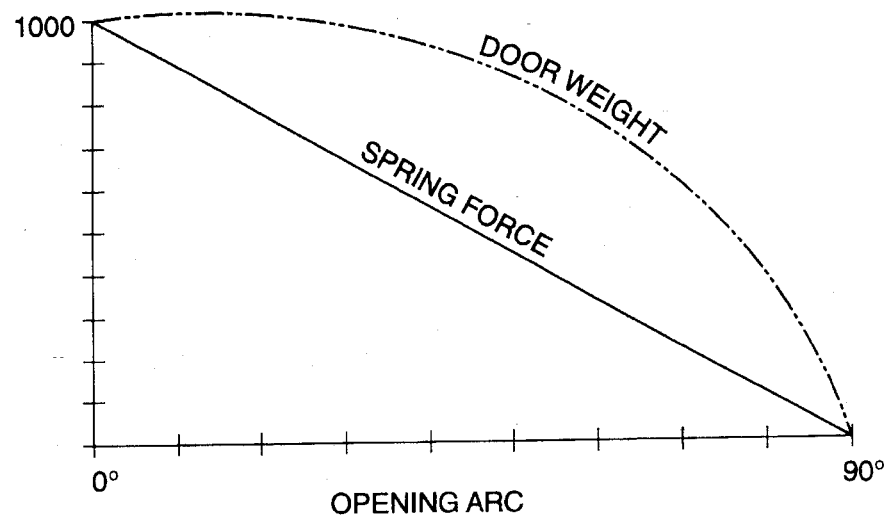
FIG. 1 is a graph indicating the relative vertical closing moment from the weight of a pit lid and the opposing spring force moment of a conventional spring assisted aircraft servicing pit lid arrangement.

FIG. 1 illustrates the relative closing moment due to the force from the vertical component of the weight of a pit lid and the opposing moment from the counteracting spring force of springs in a conventional spring assisted access lid assembly for a subsurface pit buried beneath a surface across which aircraft travel. The weight of the pit lid or cover may be 1,000 pounds and acts vertically downwardly when the pit lid resides in its horizontal, closed position. In this position the springs employed are elastically deformed to the maximum extent. For purposes of illustration this maximum spring force of stored, potential energy in the springs is shown as equal to the weight of the door, though in actuality it would normally be about 25 pounds less.

As is evident, as the pit lid door is rotated open the moment of rotation tending to close the lid that results from the vertical component of the weight of the door initially decreases only very slowly. However, as the pit lid is opened the counteracting moment from the force of the torsionally wound springs diminishes in a generally linear fashion. As a consequence, the manual force necessary to augment the spring force in raising the pit lid from its closed position increases considerably as the pit lid is initially raised. When the pit lid has been rotated partially open through an arc of approximately 45 degrees the moment from the vertical component of the weight of the pit lid door is still about 925 foot-pounds, but the opposing spring force moment that assists in raising the pit lid is only about 510 foot-pounds. As a consequence, a manual moment of the difference, which is 415 foot-pounds, must be applied to continue raising the pit lid. The force required to produce this moment exceeds considerably the strength of most individuals.

According to the present invention, on the other hand, a system is provided for sequentially isolating each of the springs of an access lid assembly from the lid as the lid is opened through intermediate positions from its closed, horizontal to a vertical position. The construction and operation of a preferred embodiment of the of the pit lid access lid assembly of the invention is illustrated in FIGS. 2–8.

Figure 2:
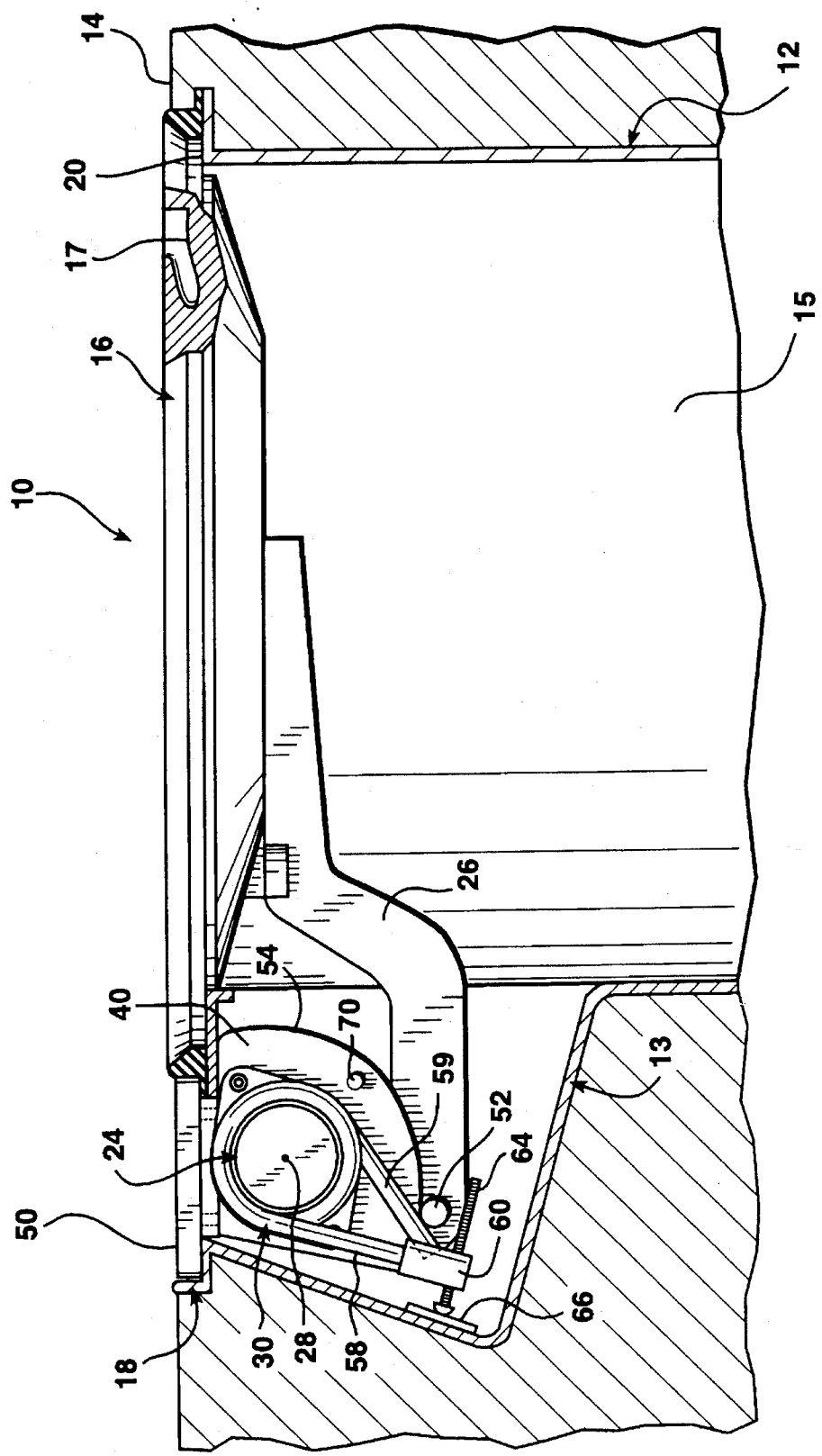
FIG. 2 is a side elevational view, partially broken away, of a preferred embodiment of a pit access lid assembly according to the invention.

FIG. 2 illustrates an access lid assembly or closure apparatus indicated generally at 10. The closure apparatus 10 is shown in position atop a subsurface pit 12 located beneath an aircraft servicing surface 14 across which aircraft travel. The pit 12 is formed with a hollow fiberglass body indicated generally at 13. The hollow pit body 13 is surrounded by poured concrete and encompasses an enclosure or cavity 15.

The closure apparatus 10 includes a heavy duty lid 16, which is a generally flat steel or aluminum structure having either a generally circular or rectangular shape. The closure apparatus 10 also includes a lid mounting frame indicated at 18 at the top of the pit 12. The upper surface of the frame 18 is at a level flush with the aircraft servicing surface 14. The lid mounting frame 18 has a shoulder 20 recessed beneath the aircraft servicing surface 14 and defining a pit access opening 22 to the enclosure 15 therewithin. The lid 16 is strong enough to withstand the weight of the tires of an aircraft travelling thereacross.

The access lid assembly 10 also includes a hinge mechanism indicated generally at 24 secured relative to both the lid mounting frame 18 and the hollow pit body 13 at the periphery of the lid 16. The hinge mechanism 24 carries the lid 16 by means of a pair of lid mounting arms 26 and 27 about a horizontal axis 28 between a horizonal position seated on the mounting frame as shown in FIG. 2, and a fully raised position in which the lid 16 resides at an angle of at least 90 degrees relative to the aircraft servicing surface 14, as shown in FIG. 3. The lid 16 is equipped with a recess forming a handgrip 17 at its periphery remote from the hinge mechanism 24. The operator manually raises the lid by pulling upwardly on the handgrip 17.

As best shown in FIG. 3 the invention employs a plurality of biasing means in the form of four torsionally wound wire cover lift springs 30, 32, 34, and 36. The cover mounting arms 26 and 27 both have proximate ends with openings therethrough that receive the axles 24 and 25, respectively. The axles 24 and 25 are respectively mounted for rotation within generally U-shaped mounting brackets 37 and 39. Each of the U-shaped mounting brackets 37 and 39 has a flat, generally horizontally disposed web 38 from which two vertically disposed longitudinally spaced sideplates 40 and 42 extend downwardly perpendicular to the coaxial alignment of the axles 24 and 25. The bracket 37 has a pair of sideplates 40 and 42 while the bracket 39 has corresponding sideplates 40' and 42'. The sideplates 40, 40', 42, and 42' are each shaped generally in the form of a sector of a circle extending over an arc of about 105 degrees, as illustrated in FIGS. 2 and 4–7. The sideplates 40, 42, 40', and 42' have curved, convex outer surfaces 54 as shown.

The sideplates 40, 40' 42, and 42' all have longitudinally aligned openings therethrough to receive the axles 24 and 25. The lid mounting arm 26 is mounted for rotation about the center of the axle 24 and rotates thereon within the longitudinal confines of the bracket mounting sideplates 40 and 42 of the bracket 37. Similarly, the lid mounting arm 27 is mounted for rotation about the axle 25 within the longitudinal confines of the bracket sideplates 40' and 42' of the bracket 39. The webs 38 of each bracket 37 and 39 are welded to their associated bracket sideplates 40, 40', 42, and 42' to maintain their respective bracket sideplates in upright vertical, longitudinally spaced dispositions relative to each other with the openings therethrough in coaxial alignment with each other.

The webs 38, in turn, are secured by bolts to the underside of an elongated, rectangular base plate 50 that extends across the top of the lid mounting frame 18 and is bolted thereto at its end extremities. Specifically, the top, horizontal web 38 of each of the brackets 37 and 39 is provided with three tapped bores therethrough. The pit lid base plate 50 is predrilled with countersunk openings spaced the same distance apart as the tapped openings in the webs of the brackets 37 and 39. The brackets 37 and 39 may thereby be secured to the underside of the pit lid base plate 50 by means of flathead bolts that are engaged with the bracket webs from above the pit lid mounting frame 18. The pit lid base plate 50, in turn, is firmly secured to the pit 12 by other bolts (not shown) in a conventional manner. The mounting brackets 37 and 39 are thereby anchored in fixed, rigid relationship relative to both the lid mounting frame 18 and the hollow body 13 of the pit 12.

The wire, coil springs 30 and 32 are coaxially mounted about the axle 24, at the opposite ends thereof, while the coil springs 34 and 36 are coaxially mounted on the opposite ends of the axle 25. The springs 30 and 32 are respectively located outboard of the bracket sideplates 40 and 42 of the mounting bracket 37. The springs 34 and 36 are respectively located outboard of the bracket sideplates 40' and 42' of the bracket 39.

The horizontally orientated axles 24 and 25 are secured to the lid mounting frame 18 beneath and radially beyond the periphery of the pit lid 16 wherein the axis of rotation 28 of the lid 16 relative to the pit body 13 is established at the coaxial centers of the axles 24 and 25. The coil springs 30, 32, 34 and 36 are each formed of coiled loops of wire disposed about their respective axles at longitudinally separated locations thereon. That is, the coiled loops of the springs 30 and 32 are disposed about the opposite ends of the axle 24, while the coiled loops of the springs 34 and 36 are disposed about the opposite ends of the axle 25.

The second ends 59 of the springs 30, 32, 34 and 36 extend from the coiled loops thereof tangentially relative to the axles 24 and 25 at the longitudinally separated locations indicated by the planes 80, 82, 84, and 86 in FIG. 3. In this way the second spring ends 59 move along separate, parallel, longitudinally displaced arcuate paths of movement lying, respectively, in the planes 80, 82, 84 and 86.

The springs 30, 32, 34, and 36 are each formed with several complete coils and terminate in opposite first ends 58 and second ends 59. The first ends 58 of the springs 30 and 32 are located furthest from the lid mount arm 37 and are captured by short sleeves 60 that extend from a cross-connecting spring adjustment weldment strap 62, as illustrated in FIG. 3. The sleeves 60 fit over the outboard first ends 58 of the springs 30 and 32. The strap 62 thereby serves to hold the first ends 58 of the springs 30 and 32 in longitudinally spaced separation from each other. Each of the sleeves 60 has a tapped, transverse bore therethrough into which an adjustment rod 64 is threaded. The adjustment rods 64 each terminate in a footpad 66 that bears against the inside wall of the hollow pit body 13.

Similarly, a spring adjustment weldment strap 63 is provided with sleeves 60 that receive the longitudinally separated first ends 58 of the springs 34 and 36 that are mounted on the axle 25. Adjustment rods 64 with footpads 66 are likewise threadably engaged with the sleeves 60 that receive the first ends 58 of the springs 34 and 36.

Each of the mounting arms 26 and 27 has a cover arm spring load pin 52 extending therethrough and secured therein in spaced separation from the apertures formed in the mounting arms for receiving the axles 24 and 25. The spring load pins 52 are thereby oriented parallel to the axles 24 and 25 in spaced separation therefrom. The ends of the load pins 52 extend outwardly from both sides of the mounting arms 26 and 27 in opposite directions. The load pins 52 protrude longitudinally beyond the bracket sideplates 40, 40', 42, and 42' and are located radially beyond the curved surfaces 54 thereof.

All of the springs 30, 32, 34, and 36 are elastically deformed and are torsionally wound so that the second ends 59 of the springs 30, 32, 34 and 36 bear against the proximately located surfaces of the cover arm spring load pins 52, as shown in FIG. 2, when the pit lid 16 is in its horizontal seated position. Since the coiled springs 30, 32, 34 and 36 are wound and prebiased when installed on their respective axles 24 and 25, all of the first ends 58 exert forces to the left against the pit body 13 as viewed in FIG. 2, while all of the second ends 59 exert forces to the right against their respective load pins 52 as viewed in that same drawing figure. The first ends 58 all exert a clockwise force as viewed in FIG. 2 and thereby all bear against the pit body 13 and relative to the mounting frame 18 of the pit 12. Since the mounting frame 18 is anchored relative to the pit 12, the first ends 58 of all of the springs 30, 32, 34 and 36 are immobilized relative to the mounting frame 18 as well as the pit body 13.

The second ends 59 of all of the springs 30, 32, 34 and 36 exert a counterclockwise force as viewed in FIG. 2. The second ends 59 of the springs 30, 32, 34 and 36 are all initially trapped in behind the cover arm spring load pins 52 and bear directly thereagainst when the pit lid 16 is in its closed, horizontally disposed position. As a consequence, all four of the springs 30, 32, 34, and 36 exert a counterclockwise force on the cover arm spring load pins 52, as viewed in FIG. 2, and tend to urge the pit lid 16 from its seated position, shown in FIG. 2, in rotation about the axis of rotation 28 in a counterclockwise direction as viewed in that drawing figure.

As best illustrated in FIG. 3, each of the mounting bracket sideplates 40, 42, 40', and 42' has a longitudinally directed obstruction pin protruding therefrom that crosses the path of movement of the first end 59 of the particular spring located proximate thereto. The obstruction pins 70, 72, 74 and 76 are formed as posts which are anchored ultimately to the hollow pit body 13. The obstruction pins 70, 72, 74 and 76 are arranged at the spaced angular distances of separation from each other corresponding to different intermediate positions of rotation of the pit lid 16 between the seated position depicted in FIG. 2 and the fully opened position depicted in FIG. 7. The four transversely directed obstruction pins 70, 74, 72, and 76 extend from opposite sides of their respective brackets 37 and 39. That is, the obstruction or bearing pins 70 and 72 extend in opposite directions from the bracket 37 while the obstruction pins 74 and 76 extend in opposite directions from bracket 39.

The obstruction pins 70, 72, 74 and 76 are all rigidly anchored to their respective bracket sideplates 40, 42, 40' and 42'. Each of the obstruction pins 70, 72, 74 and 76 projects into the arcuate path of movement of a second end 59 of a separate one of the springs 30, 32, 34 and 36. That is, the longitudinally directed obstruction pin 70 extends outwardly from the bracket sideplate 40 of bracket 37 and into the path of movement of the first end 59 of the spring 30 that lies in the plane 80. The obstruction pin 72 extends in an opposite direction from the bracket sideplate 42 and crosses the path of movement of the second end 59 of the spring 32 that lies in the plane 82. Likewise, the longitudinally directed obstruction pin 74 extends to the left from the bracket sideplate 40' of bracket 39 and passes through the plane 84 in which the second end 59 of the spring 34 lies while the obstruction pin 76 extends to the right from the bracket sideplate 42' and passes through the plane 86 in which the second end 59 of the spring 36 lies, all as shown in FIG. 3. In this way the obstructions 70, 72, 74 and 76 are separately longitudinally aligned with corresponding ones of the springs 30, 32, 34 and 36.

As illustrated in FIG. 3, and as is more evident from a comparison of FIGS. 4–7, the obstruction pins 70, 72, 74 and 76 are all oriented parallel to the lid axis of rotation 28, but are angularly displaced or offset from each other relative thereto. That is, the obstruction pin 70 is located quite low on the bracket sideplate 40 as shown in FIG. 4, while the obstruction pin 74 is angularly displaced therefrom and is located further upwardly on its bracket sideplate 40' in angular displacement from the obstruction pin 70, as shown in FIG. 5. The obstruction pin 72, in turn, is located still further upwardly on its bracket sideplate 42 as shown in FIG. 6, while the obstruction pin 76 is located still higher on its bracket sideplate 42', as shown in FIG. 7. The progression of angular displacement of the obstruction pins 70, 74, 72, and 76 is evident in FIG. 3.

The torsionally wound coil springs 30, 32, 34, and 36 are all mounted beneath the aircraft servicing surface 14. The first ends 58 of the coil springs 30, 32, 34 and 36 all bear against the pit body 13, while the second ends 59 of the coil springs all bear against the lid 16, by virtue of their contact with the cover arm spring load pins 52 and through the lid mounting arms 26 and 27 when the lid 16 is in the horizontal seated position illustrated in FIG. 2. The obstruction pins 70,

72, 74 and 76 are disposed so as to separately intercept and immobilize each of the second ends 59 of the springs 30, 32, 34 and 36 as the pit lid 16 reaches different angles of orientation relative to its horizontal seated position of FIG. 2 in moving from that position toward the fully opened position shown in FIG. 3 through the intermediate positions depicted in FIGS. 4–7.

The second ends 59 of the springs 30, 32, 34 and 36 bear against corresponding aligned ends of the laterally projecting bearing pins 52. Since the first ends 58 of the springs 30, 32, 34 and 36 are immobilized relative to the pit lid body 13 and the mounting frame 18, the second ends 59 of the springs 30, 32, 34 and 36 urge the bearing arms 26 and 27 in rotational movement to urge the pit lid 16 from its seated position depicted in FIG. 2 to its fully opened position depicted in FIG. 3.

The two lid arms 26 and 27 are longitudinally spaced from each other along the axis of rotation 28 and the springs 30, 32, 34 and 36 are coaxially aligned about the axis of rotation 28, disposed upon their respective axles 24 and 25. The longitudinally projecting pin 70 intercepts the end 59 of the spring 30 as the pie lid 16 rotates from its seated position of FIG. 2 to a position inclined 55 degrees relative thereto as shown FIG. 4. At this point of interception the horizontally projecting pin 70 prevents the end 59 of spring 30 from unwinding any further and holds it in a partially wound condition in which the second end 59 of the spring 30 no longer bears against the cover arm spring load pin 52 of the lid mounting arm 26, but rather, bears against the longitudinally projection obstruction or intercepting pin 70. Since the intercepting pin 70 is anchored to the structure of the pit through the rigid, inflexible connections of the bracket 38, the base plate 50, and the pit lid mounting frame 18, the spring 30 no longer exerts any force that assists in opening the pit lid 16 any further beyond the intermediate position of FIG. 4.

As the pit lid is swung open from the position of FIG. 4 to the position of FIG. 5, the second end 59 of the spring 36 is released until it unwinds enough to establish contact with the longitudinally projecting obstruction pin 74 as shown in FIG. 5. This occurs when the pit lid 16 has been opened to an angle of about 65 degrees relative to its closed, horizontally disposed position. At this point the second end 59 of the spring 36 can rotate no further in a counterclockwise direction, as viewed in FIG. 5, but is restrained by the cover arm spring load pin 74. Therefore, only the remaining springs 32 and 34 assist in opening the pit lid 16 wider from the intermediate position of FIG. 5.

When the pit lid 16 has been opened further to an angle of about 75 degrees relative to horizontal, the second end 59 of the spring 32 unwinds and establishes contact with the outwardly projecting intercepting or obstruction pin 72. As illustrated in FIG. 6, the obstruction pin 72 is angularly displaced upwardly from both the obstruction pins 70 and 74 at a location that corresponds with the angle of 75 degrees to which the pit lid 16 is opened as illustrated in FIG. 6. At this point the second end 59 of the spring 32 is intercepted by the obstruction pin 72 and is isolated from exerting force against the pit lid 16. From this intermediate point the pit lid 16 is aided in its further opening movement only by the spring 34.

As the pit lid 16 is opened to an angle of about 85 degrees relative to horizontal, as depicted in FIG. 7, the second end 59 of the last active spring 34 is intercepted by the longitudinally projecting post 76. From this point on the spring 34 is likewise isolated from bearing against the pit lid 16 and thereafter contributes no force toward opening the pit lid 16 any further. Any opening motion beyond this point is due solely to the manual force applied. However, since the pit lid 16 is in a near vertical position, the manual force required to move pit lid 16 further is very slight. Also, as is evident from FIG. 7, by this time the center of gravity of the pit lid 16 has passed over the axis of rotation 28, so that if the pit lid is released from the position of FIG. 7, it will continue to open under the force of gravity until its motion is halted by the obstruction posed by the pit lid frame 18 that prevents further rotational movement of the mounting arms 26 and 27.

As the pit lid 16 is opened, the springs 30, 32, 34 and 36 are sequentially disengaged therefrom. In the same manner, when the pit lid 16 is closed the springs 30, 32, 34 and 36 are sequentially re-engaged in the reverse order from which they were disengaged. This prevents the lid 16 from slamming shut.

To close the enclosure 15 the lid 16 is pushed in rotation until its center of gravity passes over the axis of rotation 28. Since the moment arm at which the center of gravity of the pit lid 16 acts thereafter increases, the downward rotation of the lid 16 will accelerate until the lid 16 has passed the angle of 75 degrees shown in FIG. 7. At this point the cover arm spring load pin 52 on the mounting arm 27 passes to a level lower than the longitudinally projecting post 76. The second end 59 of the spring 34 thereupon is re-engaged with the pit lid 16 and exerts an increasingly powerful force opposing closure of the lid 16 as the spring 34 is wound further. However, this force is only sufficient to cushion the closing lid, not to prevent it from closing further.

As the pit lid 16 continues to rotate downwardly from the position of FIG. 7, it will tend to accelerate due to the increasing length of the moment arm at which the center of gravity of the pit lid 16 acts relative to the axis of rotation 28. However, once the lid 16 passes the intermediate position of about 65 degrees relative to horizontal shown in FIG. 6, the second end 59 of the spring 32 is re-engaged with the pit lid 16 through the cover arm spring load pin 52 projecting through the plane 82 from the pit lid mounting arm 26. At this point the combined force of the springs 32 and 34 acts in opposition against further closure of the pit lid 16. Even so, the springs 32 and 34 do not prevent further closure, but only reduce the force with which the lid 16 continues to close.

As the pit lid 16 passes the intermediate position of angular orientation of about 65 degrees relative to horizontal, shown in FIG. 5, the second end 59 of the spring 36 is likewise re-engaged with the pit lid 16 through the cover arm spring load pin 52 extending through the plane 84 from the pit lid mounting arm 27. The three springs 36, 32, and 34 thereafter continue to oppose, but not prevent closure of the pit lid 16. It can be seen that as the springs are wound further, their force of opposition increases to increasingly offset the increasing closure force caused by the increasing moment arm of the weight of the pit lid 16 acting at the center of gravity of the lid.

When the pit lid 16 passes the intermediate position of 55 degrees shown in FIG. 4 in its closing movement, the second end 59 of the spring 30 is re-engaged with the cover arm spring load pin 52 projecting through the plane 80 from the pit lid mounting arm 26. Thereafter, all of the springs 30, 32, 34 and 36 oppose further closure of the lid 16. However, this force is always less than the gravitational force acting on the pit lid 16 but within about 25 pounds of that force at all times.

Figure 8:
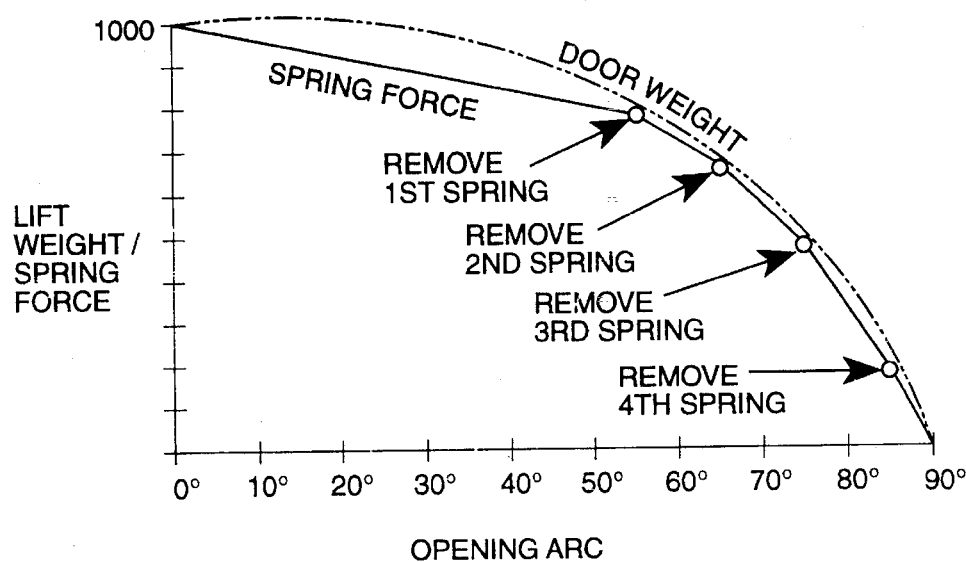
FIG. 8 is a graph indicating the relative vertical closing moment from the weight of a pit lid and the opposing spring force moment in a pit employing the pit lid assist mechanism of FIG. 2.

FIG. 8 illustrates the manner in which the spring force opposes the weight of the pit lid and thereby reduces the requisite lifting force which must be manually applied in order to open the lid according to the invention. As illustrated in FIG. 8, the maximum difference between the acting weight of the pit lid tending to close the lid and the opposing spring force in the embodiment described occurs at about 30 degrees. At this point a lid weighing 1,000 pounds will exert a moment tending to close the lid of about 950 foot-pounds, while the opposing force of the springs is about 875 foot-pounds. Therefore, the maximum net lifting moment that is required will be about 75 foot-pounds, as contrasted with a maximum moment of about 415 foot-pounds that is required in a conventional system, as shown in FIG. 1.

Because the cumulative net opposing force of the springs that are engaged so closely tracks the force of gravity acting on the lid, it is highly desirable for the preload of at least some of the springs 30, 32, 34 and 36 to be adjustable separately from at least some of the other springs. To this end, each of the springs 30, 32, 34 and 36 is provided with a means for separately adjusting the force with which each spring urges the pit lid 16 from the horizontal seated position of FIG. 2.

The mechanism for separately adjusting the spring preload is provided by the threaded rods 64 acting through the tapped transverse bores in the sleeves 60 at the first ends 58 of the springs 30, 32, 34 and 36. By turning the threaded rods 64 separately in a desired direction the sleeves 60 can either be pushed away from the wall of the pit body 13 or allowed to approach the pit wall.

When the threaded rods 64 are advanced to push the sleeves 60 away from the pit wall and thereby increase the distance of separation between the bearing pads 66 and the sleeves 60, the spring involved will be more tightly wound, and will thereby exert a greater force tending to oppose the gravitational force of the weight of the pit lid during that portion of the path of movement of the pit lid that the spring is engaged with its associated cover arm spring load pin 52. Conversely, to reduce the initial spring preload the threaded rod 64 is counter-rotated within the transverse threaded bore of the sleeve 60 through which it extends to allow the first end 58 of the associated spring to relax toward the pit wall, thereby relieving some of the torsional force which the spring exerts. The springs 30, 32, 34 and 36 are thereby each provided with adjustment means for adjusting the force of initial winding of at least some of the springs 30, 32, 34 and 36 separately and independently of the other springs. In the embodiment shown the springs 30 and 32 are normally adjusted in parallel as a pair, as are the springs 34 and 36.

Undoubtedly, numerous variations and modifications of the invention will become readily apparent to those familiar with subsurface pits for servicing aircraft. For example, the springs need not necessarily be disposed about the axles upon which the lid is hinged, but could be linearly compressed between the pit lid and the pit. Also, other types of obstruction mechanisms could be deployed to separately disengage the springs as the lid is opened. Accordingly, the scope of the invention should not be construed as limited to the specific embodiment of the invention depicted and described.

I claim:

1. In a closure apparatus for a subsurface pit for servicing aircraft located beneath an aircraft servicing surface across which aircraft travel wherein said pit has a hollow body, a lid mounting frame thereabove located flush with said aircraft servicing surface and defining a pit access opening into said hollow body, a lid strong enough to withstand the weight of the tires of an aircraft traveling thereacross and a hinge mechanism secured to said lid and secured relative to said hollow pit body at the periphery of said lid for carrying said lid in rotation about a horizontal axis between a horizontal position seated on said mounting frame and a fully raised position in which said lid resides at an angle relative to said aircraft servicing surface, the improvement comprising a plurality of biasing means interposed between said hollow pit body and said pit lid wherein all of said biasing means are arranged so as to initially urge said pit lid from said horizontal seated position toward said fully raised position, and means for disengaging at least one of said biasing means when said lid reaches an intermediate position as a result of a manual lifting force applied thereto in moving from said horizontal seated position toward said fully raised position and reengaging said at least one of said biasing means when said lid reaches said intermediate position in moving from said fully raised position toward said horizontal seated position.

2. A closure apparatus according to claim 1 wherein said biasing means are each formed of a torsionally wound coil spring mounted beneath said aircraft servicing surface and having first and second ends and wherein said first ends of said coil springs bear against said hollow pit body and said second ends of said coil springs bear against said lid when said lid is in said horizontal seated position, and said disengaging means includes obstruction members for separately intercepting and immobilizing each of said second ends of said springs as said pit lid reaches a different angle of orientation relative to said horizontal seated position in moving from said horizontal seated position toward said fully raised position.

3. A closure apparatus according to claim 1 wherein said hinge mechanism includes at least one horizontally oriented axle secured to said lid mounting frame beneath and beyond the periphery of said pit lid and wherein said axis of rotation is at the center of said at least one axle, and wherein said coil springs are each formed of coiled loops of wire disposed about said at least one axle at longitudinally separated locations thereon and of legs forming said second spring ends extending from said coiled loops tangentially relative to said at least one axle at said longitudinally separated locations thereon, whereby said second spring ends move along separate, parallel longitudinally displaced arcuate paths of movement, and wherein said hinge mechanism comprises at least one lid mounting arm joined to said lid and mounted for rotation upon said at least one axle, and further comprising a plurality of transversely directed bearing pins extending in opposite longitudinal directions from said at least one lid mounting arm so as to be separately longitudinally aligned with corresponding ones of said springs and so as to be longitudinally displaced from each other, whereby said second ends of said springs bear against corresponding aligned ones of said laterally projecting bearing pins to separately exert forces on said at least one bearing arm to urge said pit lid from said seated position toward said fully raised position, and said obstruction members are formed by posts anchored relative to said mounting frame each of which projects into a separate one of said aforesaid arcuate paths of movement.

4. A closure apparatus according to claim 3 further comprising a plurality of lid mounting arms as aforesaid longitudinally spaced from each other along said axle.

5. A closure apparatus according to claim 1 further comprising means for separately adjusting the strength with which each of said biasing means urges said pit lid from said horizontal seated position.

6. A pit for servicing aircraft located beneath an aircraft servicing surface across which aircraft travel while on the ground comprising: a hollow body defining a subsurface chamber, a lid mounting frame at the top of said hollow body defining an access opening to said subsurface chamber therewithin, a lid strong enough to withstand the weight from the tires of an aircraft traveling thereacross for covering said access opening, a lid hinge mechanism secured with respect to said lid mounting frame at a peripheral location relative to said pit lid and connected to said lid at a distance from the center of gravity of said pit lid, whereby said lid is rotated between a horizontal seated position in said lid mounting frame at which the weight of said lid acts at a maximum moment arm equal to the aforesaid distance of said center of gravity from said peripheral location, through an arc along which the weight of said lid acts at a moment arm that decreases as said center of gravity of said lid approaches vertical alignment with said peripheral location, and a raised fully opened position in which said lid resides at an angle relative to said aircraft servicing surface, a plurality of springs interposed between said lid and said hollow body, and spring disengaging means for disengaging at least one of said springs from said lid at an intermediate position of rotation of said lid between said seated and fully opened positions, whereby all of said springs urge said lid from said seated position toward said intermediate position and less than all of said springs urge said lid from said intermediate position when a manual lifting force is applied thereto toward said fully opened position.

7. A pit according to claim 6 wherein said lid hinge mechanism is comprised of at least one axle secured to said lid mounting frame below the level of said aircraft servicing surface and at least one lid mounting arm coupled for rotation on said at least one axle and joined to said pit lid, and said springs are interposed between said hollow body and said lid and torsionally wound to act therebetween at longitudinally separated locations along said at least one axle, whereby said springs act upon said at least one lid mounting arm in separate spring force application planes that are parallel to each other and perpendicular to said at least one axle, and said spring disengaging means is comprised of at least one intercepting element that resides in at least one selected spring force application plane to inhibit further relaxation of a spring acting in said at least one selected plane as said pit lid rotates beyond a predetermined angle from said horizontal seated position toward said fully opened position.

8. A pit according to claim 7 further comprising a plurality of lid mounting arms and a plurality of intercepting elements as aforesaid.

9. A pit according to claim 7 further comprising means for adjusting the initial extent of torsional winding applied to each of said springs when said pit lid is in said seated position.

10. A pit to claim 6 wherein said lid hinge mechanism is comprised of at least one axle secured relative to said lid mounting frame below the level of said aircraft servicing surface and a pair of lid mounting arms coupled for rotation at longitudinally separated locations on said at least one axle and joined to said pit lid, each lid mounting arm having a plurality of transversely directed bearing pins extending parallel to said at least one axle, and said springs are torsionally wound coil springs disposed at longitudinally spaced locations along said at least one axle, said springs having first ends immobilized relative to said hollow body and second ends that act against separate ones of said bearing pins on said lid mounting arms in separate parallel spring action planes perpendicular to said at least one axle when said pit lid is in said seated position, and said spring disengaging means is comprised of a plurality of rigid members all anchored relative to said lid mounting frame and each projecting into separate ones of said spring action planes so as to intercept and engage said second ends of said springs separately as said pit lid passes through different intermediate angles relative to said aircraft servicing surface in rotating from said seated position toward said fully opened position.

11. In an access lid assembly including a lid which is able to withstand the weight applied by the tires of an aircraft traveling thereacross and a mounting frame located atop a subsurface chamber used to service aircraft and defining an opening therewith and in which said lid is movable to a horizontal seated position, a hinge joining said lid to said mounting frame for upward rotation about a horizontal axis from said horizontal position through an arc of at least ninety degrees to a fully opened position, a plurality of springs interposed between said lid and said mounting frame and all acting in parallel to urge said lid in rotation from said seated position toward said fully opened position through a predetermined acute arcuate angle of rotation from said seated position that is short of said fully opened position, the improvement comprising disengaging means for isolating at least one of said springs from said lid once said lid reaches said predetermined acute arcuate angle as a result of a manual lifting force applied thereto in moving from said seated position toward said fully opened position, and less than all of said springs urge said lid toward said fully opened position beyond said predetermined acute arcuate angle.

12. An access lid assembly according to claim 11 wherein said springs are all torsionally wound coil springs each having a first end that is held stationary relative to said mounting frame and a second end that bears against said pit lid when said pit lid is in said seated position and said second ends of said springs tend to follow movement of said pit lid as said pit lid opens thereby allowing said springs to uncoil, and said disengaging means includes at least one obstruction lying beneath said pit lid and anchored relative to said mounting frame to engage said second end of said at least one of said springs as said pit lid moves from said seated position toward said fully opened position to thereupon limit unwinding of said at least one of said springs and remove the force thereof from said pit lid.

13. An access lid assembly according to claim 12 wherein said disengaging means further comprises a plurality of said obstructions, each disposed to engage a different one of said springs at a different intermediate position of rotation of said pit lid from said horizontal position toward said fully opened position.

14. An access lid assembly according to claim 13 wherein said disengaging means further comprises a first obstruction that engages a first of said springs as said pit lid rotates to about fifty-five degrees from said horizontal position.

15. An access lid assembly according to claim 14 wherein said disengaging means further comprises a second obstruction that engages a second of said springs as said pit lid rotates to about sixty-five degrees from said horizontal position.

16. An access lid assembly according to claim 15 wherein said disengaging means further comprises a third obstruction that engages a third of said springs as said pit lid rotates to about seventh-five degrees from said horizontal position.

17. An access lid assembly according to claim 16 wherein said disengaging means further comprises a fourth obstruction that engages a fourth of said springs as said pit lid rotates to about eight-five degrees from said horizontal position.

18. An access lid assembly according to claim 17 further comprising means for adjusting the force of initial winding of said springs independently of other of said springs.

* * * * *